(12) United States Patent
Luther et al.

(10) Patent No.: US 7,150,567 B1
(45) Date of Patent: Dec. 19, 2006

(54) FIBER OPTIC CONNECTOR HAVING KEYED FERRULE HOLDER

(75) Inventors: James P. Luther, Hickory, NC (US); Thomas Theuerkorn, Hickory, NC (US); Hleu V. Tran, Charlotte, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/139,734

(22) Filed: May 27, 2005

(51) Int. Cl.
*G02B 6/36* (2006.01)
(52) U.S. Cl. .............................. 385/78; 385/60; 385/72
(58) Field of Classification Search .................. 385/55, 385/60, 72, 78, 83, 84, 140; 285/260; 333/209; 439/607
See application file for complete search history.

(56) References Cited

U.S. PATENT DOCUMENTS

| | | | |
|---|---|---|---|
| 6,206,579 B1 | 3/2001 | Selfridge et al. | 385/60 |
| 6,234,683 B1 | 5/2001 | Waldron et al. | 385/78 |
| 6,264,374 B1 | 7/2001 | Selfridge et al. | 385/78 |
| 6,305,849 B1 | 10/2001 | Roehrs et al. | 385/59 |
| 6,357,929 B1 | 3/2002 | Roehrs et al. | 385/59 |
| 6,371,660 B1 | 4/2002 | Roehrs et al. | 385/59 |
| 6,579,014 B1 | 6/2003 | Melton et al. | 385/76 |
| 6,648,520 B1 | 11/2003 | McDonald et al. | 385/78 |
| 6,678,448 B1 | 1/2004 | Moisel et al. | 385/101 |
| 6,955,479 B1 * | 10/2005 | Erdman et al. | 385/78 |
| 2005/0117850 A1 | 6/2005 | Milette | |

OTHER PUBLICATIONS

Fiber Systems International Fiber Optics Solutions Product Sheet, TFOCA-II® 4-Channel Fiber Optic Connector, 2 sheets, 2003.
STRATOS Lightwave ™, Hybrid HMA Series, Jul. 16, 2002.
INFOLITE Data Sheet.

* cited by examiner

*Primary Examiner*—John D. Lee
(74) *Attorney, Agent, or Firm*—Jeffrey S. Bernard (57) ABSTRACT

A fiber optic connector including one or more ferrule assemblies having a ferrule and a keyed ferrule holder defining a first key slot and a second key slot, and a connector housing defining a key that is received within the first or the second key slot. The first key slot configures the connector in a first keyed position for simultaneous, coplanar end face polishing of the ferrules, and the second keyed position configures the connector for mating with a receptacle, optical device or another connector. A fiber optic connector including a connector outer housing defining a first key slot for positioning the connector housing in a first keyed position and a second key slot for positioning the connector housing in a second keyed position, a connector inner housing defining a key and a ferrule assembly including a ferrule and a ferrule holder, wherein the ferrule assembly is biased outwardly within the connector outer housing. The connector outer housing is independently positionable between the first keyed position for end face polishing and the second keyed position for connector mating.

19 Claims, 6 Drawing Sheets

FIG. 6B

FIBER OPTIC CONNECTOR HAVING KEYED FERRULE HOLDER

BACKGROUND OF THE INVENTION

1. Field of the Invention

The present invention relates generally to fiber optic connectors, and more specifically, to a duplex fiber optic connector having positionable ferrules that allow the ferrules to be rotated between a first keyed position for simultaneous coplanar end face polishing, and a second keyed position for mating with a receptacle, optical device or another connector of complimentary ferrule configuration with proper end face contact.

2. Technical Background

A variety of optical connectors have been developed to facilitate the interconnection of optical fibers with other optical fibers, optical devices or the like. In this regard, a number of simplex, duplex and multi-fiber connectors including standard ferrules, such as SC, LC, FC, MU, MT and MTP, have been designed. A common type of connector includes an angled-physical-contact (APC) ferrule that is designed to make physical contact with another APC ferrule during the process of interconnecting optical fibers (i.e., mating opposing fiber optic connectors). The end face of an APC ferrule is disposed at a non-orthogonal angle, i.e., at an angle other than 90-degrees relative to the longitudinal axis defined by the ferrule. Typically, the end face of an APC ferrule is disposed at about an 8-degree angle relative to a plane that extends perpendicular to the longitudinal axis defined by the ferrule. In order to interconnect a pair of APC ferrules, the ferrules are positioned such that the angled end faces are complimentary to one another, that is, the forward-most portion of the end face of one ferrule is preferably aligned with the rearward most portion of the end face of the other ferrule. In order to facilitate the proper alignment of the ferrules in this complimentary fashion, the connectors are mated in a specific manner. In certain APC connectors, a portion of the connector assembly includes a physical key, indicator or marking that is disposed in a predetermined relationship to the end face of the ferrule and is used to orient the connector relative to a mating connector.

APC ferrules may be preferred over physical-contact (PC) ferrules, as well as ultra-physical-contact (UPC) ferrules, because the angled end face of an APC ferrule advantageously reduces undesirable reflections of optical signals at the interface between the mating optical fibers, thereby decreasing losses and correspondingly increasing signal transmission. Conventional APC ferrules typically require that the amount of material removed from the ferrule to define the angled end face be precisely controlled so as to form the proper angled surface. In this regard, the removal of either too much or too little material during the process of polishing the end faces typically results in a misalignment of mating ferrules, which decreases signal transmission.

In conventional, industry standard LC or SC APC duplex connectors, the two ferrules are typically aligned parallel (side-by-side) such that the two end faces are not coplanar. This orientation is needed in order to mate the duplex connector with an industry standard connector having the same complimentary orientation. By aligning the ferrules side-by-side, with the ferrule end faces in different planes, it is not possible to simultaneously polish the two ferrule end faces in the same plane using conventional apparatus and processes. When assembling a hardened duplex fiber optic connector using conventional LC or SC APC ferrules, the design of the hardened connector does not allow the ferrules to be separated and their end faces oriented into the same plane for simultaneous polishing. By polishing the end faces individually, one end face may be polished differently than the other, thus resulting in connector-to-connector mating with improper end face contact and resulting signal loss. Accordingly, what is needed is a duplex hardened connector that allows the ferrules and their respective end faces to be aligned relative to one another for coplanar polishing, and thereafter moved to a mating position.

In particular, a new approach is needed for a hardened duplex fiber optic connector that allows the ferrules to be rotated such that the end faces may be positioned in the same plane for simultaneous coplanar polishing. Thus, a multi-position ferrule or ferrule holder is needed that allows each ferrule to be rotated between a first position in which the end faces of the ferrules are coplanar for polishing, and a second position that properly aligns the end faces for connector-to-connector mating with a corresponding duplex connector of like ferrule configuration. The first keyed ferrule position preferably allows both ferrule end faces to be polished at the same time using conventional apparatus and processes. Once the polish is complete, the ferrules are rotated to the second keyed position for connector mating.

SUMMARY OF THE INVENTION

One aspect of the invention is a duplex fiber optic connector including a first single fiber ferrule and a second single fiber ferrule arranged side-by-side, wherein the first and the second single fiber ferrules may be independently rotated between a first keyed position and a second keyed position. The first keyed position properly aligns the end face of the first ferrule and the end face of the second ferrule substantially in the same plane for simultaneous coplanar end face polishing using conventional polishing apparatus and processes. The second keyed position properly aligns the end face of the first ferrule and the end face of the second ferrule for mating with a receptacle, connector or optical device of like ferrule type in which the end faces of the ferrules are not coplanar. The second keyed position may also be used to align the end face of the first ferrule and the end face of the second ferrule with a connector of like ferrule configuration and with proper end face contact.

In another aspect, the present invention provides a fiber optic connector in which each ferrule holder may be rotated between a first keyed position for end face polishing, and a second keyed position for mating with a receptacle, optical device or another connector of like ferrule type with proper end face contact. The keyed ferrule holder design may be used with any known simplex, duplex or multi-fiber connector in which it is desired to independently position or rotate each ferrule of the connector. The first keyed position may be used to arrange the end faces of the ferrules in a common plane for simultaneous end face polishing. Polishing may be performed using conventional polishing apparatus and processes. The second keyed position may be used to independently arrange the alignment of the end face of each ferrule in order to properly mate the connector with a receptacle, optical device or another connector having a predetermined ferrule arrangement, such as an industry standard connector of like ferrule type.

In yet another aspect, the present invention provides a fiber optic connector assembly including one or more keyed ferrule holders that may be rotated between a first keyed position for end face polishing and a second keyed position for mating with a receptacle, optical device or another connector. In one particular embodiment, the fiber optic connector is a duplex connector including a first APC ferrule and a second APC ferrule. In an exemplary embodiment, the duplex connector includes a plug housing defining an internal cavity opening through opposed first and second ends, a section of heat shrinkable tubing, a flexible boot, a coupling nut, a protective/pulling cap assembly, a crimp body, a crimp band, an connector inner housing, an connector outer housing and one or more ferrules having a keyed ferrule holder. In a specific embodiment, the ferrules are APC ferrules. In a further embodiment, the connector assembly includes a biasing member that operably engages and biases the respective ferrule toward the mating ferrule during connector mating. To mate the fiber optic connector with a like fiber optic connector or a receptacle including a like ferrule arrangement, the externally threaded coupling nut of the connector assembly is received, for example, within an internally threaded receptacle, an internally threaded coupling nut of another connector or an internally threaded alignment sleeve.

In yet another aspect, the present invention provides a fiber optic connector assembly including one or more keyed ferrule holders that may be rotated between a first keyed position for end face polishing and a second keyed position for mating with a receptacle, device or other connector. In one particular embodiment, the fiber optic connector is a duplex connector including a first APC ferrule and a second APC ferrule. The duplex connector includes a connector housing defining an internal cavity opening through opposed first and second ends, a section of heat shrinkable tubing, a flexible boot, a coupling nut, a protective/pulling cap assembly, a crimp body, a crimp band, an connector inner housing, an connector outer housing, one or more ferrules having a keyed ferrule holder, and a biasing member that operably engages a respective ferrule. The mating position of the ferrules may be reconfigured for polishing by pushing the ferrule inwards, clearing a key and rotating the ferrule holder to an alternate key slot position. In a particular embodiment in which the ferrule is an APC ferrule, the first and second key slots may be located about 90-degrees apart.

Additional features and advantages of the invention will be set forth in the following detailed description, and in part will be readily apparent to those skilled in the art from that description or recognized by practicing the invention as described herein, including the accompanying drawings and the appended claims.

It is to be understood that both the foregoing general description and the following detailed description present exemplary embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the detailed description, serve to explain the principles and operations thereof.

DETAILED DESCRIPTION OF THE PREFERRED EMBODIMENTS

Reference will now be made in detail to the present preferred embodiments of the invention, examples of which are illustrated in the accompanying drawings. Whenever possible, the same reference numerals will be used throughout the drawings to refer to the same or like parts. An exemplary embodiment of a duplex fiber optic connector according to the invention is shown in FIG. 1 with the fiber optic connector designated generally throughout the various figures by reference numeral 20.

Referring now specifically to the accompanying drawings, FIGS. 1–6 show a duplex fiber optic connector 20 including two individual SC APC connectors mounted side-by-side on a duplex cable. As is known in the art, SC connectors include a single optical fiber in a standard-sized (2.5 mm diameter) ceramic ferrule. As is also known in the art, LC connectors hold a single optical fiber in a smaller (1.25 mm diameter) ceramic ferrule and may be used in environments in which a small form factor connector is needed. A duplex fiber optic connector having a positionable ferrule holder in accordance with the present invention typically utilizes SC or LC ferrules based on their advantageous size. While a duplex connector including two SC APC connectors is shown, the present invention is not intended to be limited to that specific connector type or number of connectors. In addition, multifiber and non-APC connectors may benefit from the principles and advantages of the present invention.

Figure 1:
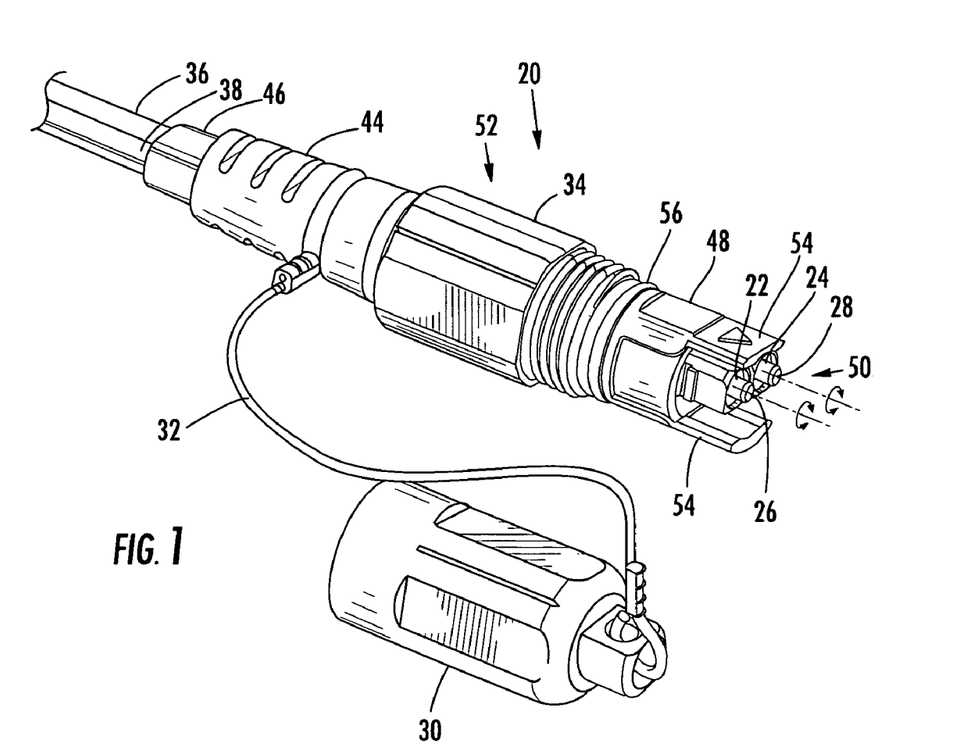
FIG. 1 is a perspective view of a duplex fiber optic connector including multi-position ferrule holders that may be rotated to facilitate simultaneous and coplanar ferrule end face polishing, shown with the protective dust cap of the connector removed.

Referring specifically to FIG. 1, a duplex fiber optic connector 20 including a first single fiber ferrule 22 and a second single fiber ferrule 24 arranged side-by-side is shown. The first and the second single fiber ferrules 22, 24 may be independently rotated between a first keyed position and a second keyed position. The first keyed position properly aligns the end face 26 of the first ferrule 22 and the end face 28 of the second ferrule 24 substantially in the same plane for simultaneous coplanar end face polishing. As is known in the art, end face polishing may be performed using conventional polishing apparatus and processes. The second keyed position properly aligns the end face 26 of the first ferrule 22 and the end face 28 of the second ferrule 24 for mating with a receptacle, optical device or another connector of like ferrule type in which the end faces of the ferrules are not coplanar. The second keyed position may also be used to align the end face 26 of the first ferrule 22 and the end face 28 of the second ferrule 24 with a connector having an industry standard configuration.

The duplex fiber optic connector 20 is shown with the combination protective dust/pulling cap 30 removed. The protective dust/pulling cap 30 is secured to a portion of the connector 20 by a flexible lanyard 32. A threaded coupling nut 34 on the connector 20 may be operable for securing the connector 20 to a receptacle (not shown), optical device (not shown) or another connector (not shown) upon engagement and may also be used to secure the dust/pulling cap 30 on the connector 20 during shipping and deployment of the duplex cable 36. The coupling nut 34 may be replaced with a bayonet or push-pull mechanism to secure the connector 20 within the receptacle, optical device or another connector. Alternatively, a spring clip or similar device may be added to engage the connector 20 with the receptacle, optical device or another connector to secure them together. Sealing may be removed or relaxed based upon the extent of the adverse environment to which the connector assembly is exposed. Although not shown, the dust/pulling cap 30 may define a pulling loop at its forward end. In preferred embodiments, the pulling loop should be able to withstand cable-pulling forces up to about 600 lbs. The fiber optic connector 20 and dust/pulling cap 30 provide a fully sealed design that prevents moisture and contamination from reaching the ferrule end faces 26, 28. In all embodiments, elastic seals, grommets or O-rings may be used to provide static seals, and their position combined with relief features to minimize vacuum build-up during unplugging the connector or pressure build-up when mating the plug with a receptacle, optical device or another connector. Generally speaking, most of the components of the connector 20 are formed from a suitable polymer. Preferably, the polymer is a UV stabilized polymer such as ULTEM 2210 available from GE Plastics. However, other suitable materials may also be used. For example, stainless steel or any other suitable metal may be used for various components without departing from the spirit of the invention.

In the embodiments shown and described herein, different types of fiber optic cables may function as the connector cable, also referred to herein as the "drop cable", such as, but not limited to, monotube, loose tube, central tube, ribbon, flat dielectric and the like. However, in the exemplary embodiments shown, the drop cable is a duplex cable 36 and comprises a cable jacket 38 with a strength component and an optical transmission component disposed within the cable jacket. In one embodiment, the strength component comprises two glass-reinforced plastic (GRP) strength components (indicated at reference numeral 40 in FIG. 4), and the optical transmission component (indicated at reference numeral 42 in FIG. 4) comprises an optical waveguide disposed within a central tube, such as a buffer tube. The drop cable may also comprise strength members that provide additional tensile strength. It is understood that other cable types may be used in conjunction with the present invention. Moreover, various optical connectors may be used with different fiber optic cables in accordance with the principles of the present invention, thereby resulting in numerous cable/connector combinations. The cable 36 is preferably designed to provide stable performance over a wide range of temperatures and to be compatible with any telecommunications grade optical fiber. As used herein, the term "optical fiber" is intended to include all types of single mode and multi-mode light waveguides, including one or more bare optical fibers, coated optical fibers, loose-tube optical fibers, tight-buffered optical fibers, ribbonized optical fibers or any other expedient for transmitting light signals.

At the end of the connector 20 opposite the dust/pulling cap 30, a pre-formed, elastomeric boot 44 covers the rear of the connector 20 and generally inhibits kinking while providing bending strain relief to the cable 36 near the connector 20. Disposed immediately underneath the elastomeric boot 44 is a section of heat shrinkable tubing 46 that is secured over a portion of the cable 36 and a portion of a plug housing 48. The heat shrinkable tubing 46 protects the rear of the connector 20 from the environment and provides a sealing function. The boot 44 may be pre-manufactured (e.g., molded) and assembled onto cable 36, or may be overmolded using a technology available from Corning Cable Systems LLC of Hickory, N.C. Further, the heat shrinkable tubing 46 may be used to fulfill the same purpose as the boot 44 when aesthetics are less important and bend characteristics less stringent.

The plug housing 48 defines an internal cavity opening through opposed first 50 and second 52 ends. The plug housing 48 generally protects the ferrules 22, 24 and in preferred embodiments also aligns and keys engagement of the connector 20 with the mating receptacle, alignment sleeve, optical device or another connector. In the embodiment shown, the first end 50 of the plug housing 48 defines alignment and keying features 54 that permit mating in only one orientation and also provide access to the end faces of the ferrules 22, 24 from the sides of the connector 20. In preferred embodiments, this orientation may be marked on the features 54 using alignment indicia so that a less skilled field technician can readily mate the connector 20 with the receptacle, alignment sleeve, optical device or other connector. Any suitable indicia may be used. After alignment, the field technician engages the coupling nut 34 to secure the connector 20 to the mating component. The plug housing 48 may further define a shoulder 56 that serves as a mechanical stop for a conventional elastomeric O-ring (not shown), as well as the coupling nut 34. The O-ring provides an environmental seal when the coupling nut 34 engages the mating component. Preferably, the coupling nut 34 has an interior passageway sized to loosely fit over the second end 52 of the plug housing 48 so that the coupling nut 34 rotates without any significant resistance about the plug housing 48.

Figure 2:
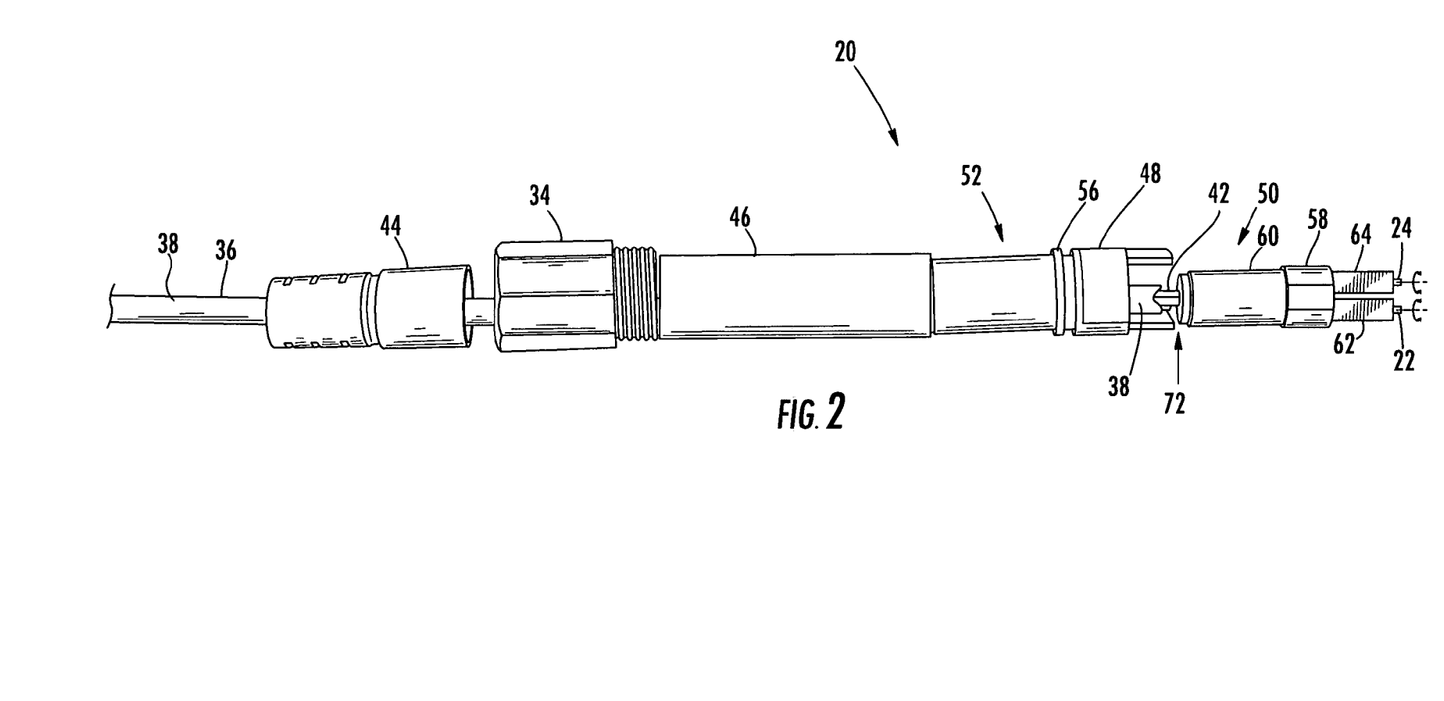
FIG. 2 is a perspective view of the duplex fiber optic connector of FIG. 1 shown disassembled.

Referring now to FIG. 2, the duplex fiber optic connector of FIG. 1 is shown disassembled. A portion of the cable sheath 38 is removed to expose the underlying optical component 42. The optical component 42 of the cable 36 is received within two substantially similar halves of a crimp body 58 that are secured together around the optical component 42 by a crimp band 60. As will be shown in more detail in FIG. 4, a connector inner housing is also received within the crimp body 58. Any exposed portion 72 of the cable 36 between the cut sheath 38 and the crimp body 58 is covered by the plug housing 48 and sealed by the heat shrinkable tubing 46. As is well understood by those of ordinary skill in the art, the plug housing 48, the heat shrinkable tubing 46, the crimp band 60, the flexible boot 44 and the coupling nut 34 are threaded onto the cable 36 before the two halves of the crimp body 58 are brought together. The plug housing 48 defines an internal stop (not shown) that properly positions the crimp body 58 relative to the plug housing and prevents it from being rotated with respect to the crimp body 58 or being pulled off the cable assembly beyond the crimp body 58.

Figure 3A:
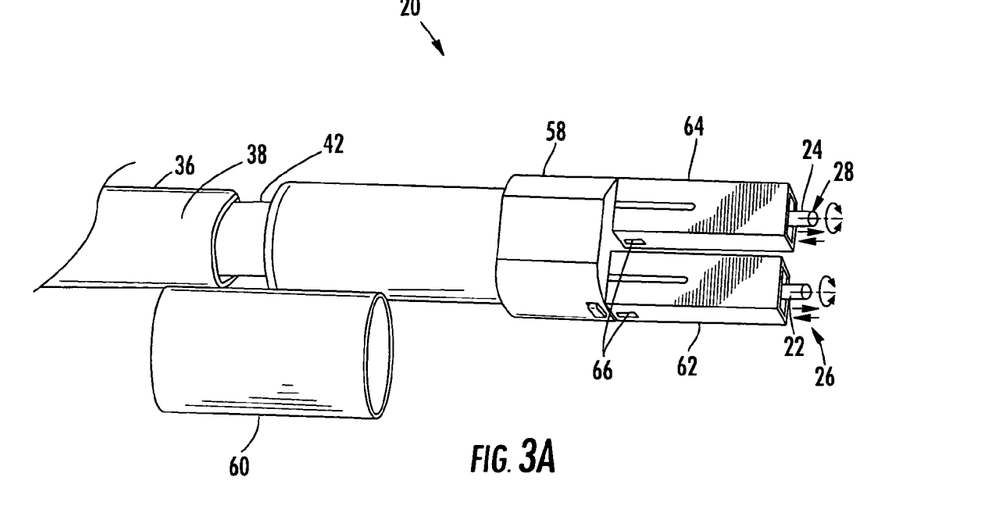
FIG. 3A is an enlarged perspective view of a portion of the duplex fiber optic connector of FIG. 1 including two SC ferrules whose end faces are positioned in a first substantially coplanar position for simultaneous polishing.
Figure 3B:
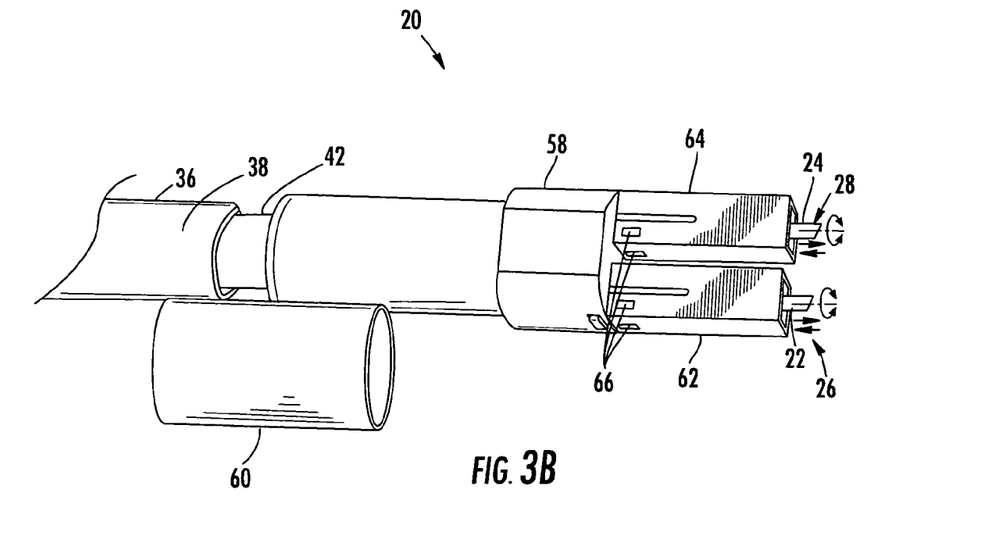
FIG. 3B is an enlarged perspective view of a portion of the duplex fiber optic connector of FIG. 1 including two SC ferrules whose end faces are positioned in a second non-coplanar position for mating.

Referring now to FIGS. 3A and 3B, the crimp body 58 and connector housing portion of the duplex fiber optic connector of FIG. 1 are shown enlarged and with the crimp band 60 removed in order to illustrate the connector outer housings 62, 64 and first and second keyed positions of the outer housings 62, 64. In FIGS. 3A and 3B, the end faces of the ferrules 22, 24 are shown at an exaggerated angle for illustrative purposes only. In preferred embodiments, the end face of the APC ferrules 22, 24 are disposed at about an 8-degree angle relative to a plane that extends perpendicular to the longitudinal axis defined by the ferrule. Referring specifically to FIG. 3A, the connector outer housings 62, 64 and ferrules 22, 24 are positioned in a first, substantially coplanar orientation for polishing. The end faces 26, 28 are positioned so that they may be polished simultaneously using conventional apparatus and processes as is known in the art. Referring specifically to FIG. 3B, the connector outer housings 62, 64 and the ferrules 22, 24 are positioned in a second, non-coplanar position for mating with an opposing connector. The connector mating position aligns the ferrule end faces 26, 28 in an industry standard configuration in which each ferrule 22, 24 is rotated in the same clockwise direction approximately 90-degrees from its polishing position. In an alternative embodiment, each ferrule 22, 24 may be rotated about 90-degress in a counter-clockwise direction to achieve the same industry standard configuration. Key slots are shown at reference number 66, and the details of rotating the connector outer housings 62, 64, and in turn the ferrule end faces 26, 28, between their first and second positions is described below and shown in FIG. 4.

Figure 4:
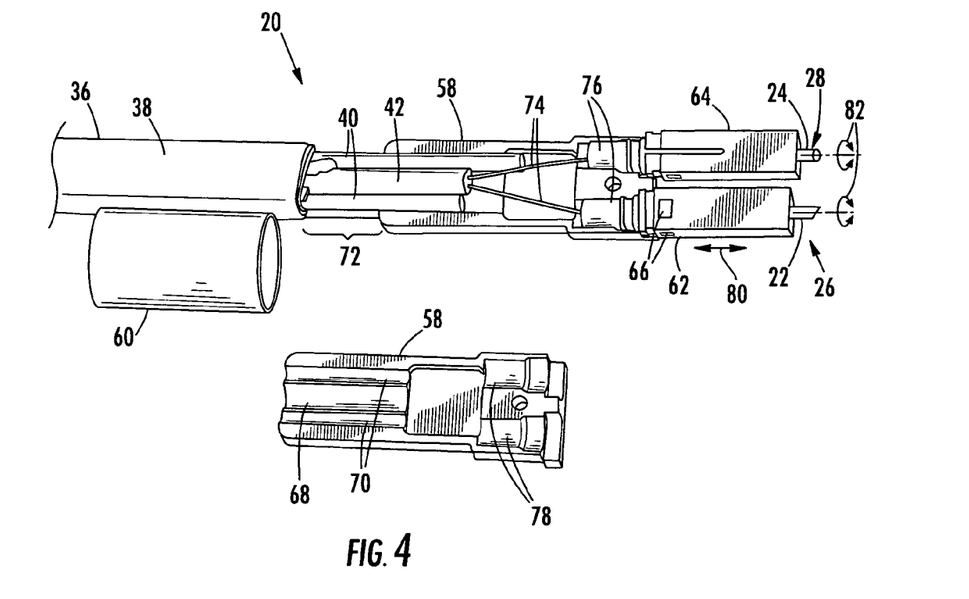
FIG. 4 is a perspective view of the duplex fiber optic connector of FIG. 3 shown with the crimp band and one-half of the crimp body removed for purposes of clarity.

Referring to FIG. 4, the portion of the duplex fiber optic connector of FIGS. 3A and 3B is shown with the crimp 60 band and one-half of the crimp body 58 removed for purposes of clarity. The crimp body 58 defines on its inner surface a recess 68 for receiving the optical transmission component 42 and a pair of recesses 70 for receiving the pair of GRP strength components 40. The optical transmission component 42 and the GRP strength components 40 are terminated and are held between the two halves of the crimp body 58. The two halves of the crimp body 58 are then secured together by the crimp band 60. The crimp band 60 provides strain relief for the cable 36 through the GRP strength components 40 and is preferably made from brass, but other suitable deformable materials may be used. In the embodiment shown, the cable jacket 38 is cut and stripped back and does not enter the crimp body 58. In an alternative embodiment, a portion of the cable jacket 38 may also be received within a recess defined by the crimp body 58 to provide strain relief to the cable jacket instead of or in addition to the strain relief provided by the GRP strength components 40 and the crimp body.

As is well known to one of ordinary skill in the relevant art, the two optical fibers 74 of the duplex cable 36 terminate within longitudinally extending optical fiber bores of the two single fiber ferrules 22, 24. The connector outer housings 62, 64 are not secured by the crimp body 58, but are free to be pulled away from the crimp body 58, rotated to the desired, keyed position and pushed back into place against the crimp body 58. The connector inner housings 76 are received within recesses 78 defined by the crimp body halves 58 and are held between the two halves. The ferrules 22, 24 are rotated between their first and second keyed positions by pulling the connector outer housings 62, 64 out away from the crimp body 58 sufficiently to clear the corresponding connector inner housing 76, and rotating the outer housings to either their first or second keyed position. Once positioned, the connector outer housings 62, 64 are then pressed back in towards the crimp body 58 and the key slot 66 formed in the connector outer housing receives the key defined by the connector inner housing 76. As shown, the first and second keyed positions are separated by and are achieved by rotating the connector outer housings 62, 64 about 90-degrees in either the clockwise or counter-clockwise direction. Movement of the outer housings 62, 64 relative to the crimp body 58 is represented by reference numbers 80 and 82 in FIG. 4. In an alternative embodiment, the entire connector housing assembly, including both the connector inner housings 76 and the connector outer housings 62, 64 may be rotated by removing one half of the crimp body 58, rotating the connector housing assembly to the desired position, replacing the one half of the crimp body 58 that was previously removed and installing the crimp band 60.

The connector outer housings 62, 64 define key slots 66 on two adjacent sides. The underlying connector inner housings 76 define a key (not shown) that is received within the key slot 66 of the connector outer housings 62, 64. As shown in FIG. 4, the duplex fiber optic connector 20 includes a first single fiber ferrule 22 and a second single fiber ferrule 24 arranged side-by-side, wherein the first and the second single-fiber ferrules 22, 24 may be independently rotated between a first keyed position and a second keyed position. As shown, the first ferrule end face 26 is aligned in the mating position, and the second ferrule end face 28 is rotated about 90-degrees relative to the first ferrule end face 26 to the polishing position. Each connector outer housing 62, 64 may be moved between the polishing and mating positions by a rotation of about 90-degrees around the longitudinal axis defined by the ferrules 22, 24.

Referring to FIGS. 5A–6B, in another embodiment, the present invention provides a fiber optic connector assembly 20 including one or more keyed ferrule holders 84 that may be rotated between a first keyed position for end face polishing and a second keyed position for mating with a receptacle, optical device or another connector. In one particular embodiment, the fiber optic connector is a duplex fiber optic connector including a first APC ferrule 22 and a second APC ferrule 24. In an exemplary embodiment, the duplex connector includes a connector housing defining an internal cavity opening through opposed first and second ends, a section of heat shrinkable tubing, a flexible boot, a coupling nut, a protective dust/pulling cap assembly, a crimp body, a crimp band, and a pair of keyed ferrule holders 84 for securing the ferrules 22, 24. In a further embodiment, the connector assembly 20 includes a biasing member that operably engages and biases the respective ferrule 22, 24 toward the mating ferrule during connector mating. In a still further embodiment, the connector assembly 20 includes a second biasing member that operably engages the ferrule 22, 24 during movement between the first and second keyed positions.

Figure 5A:
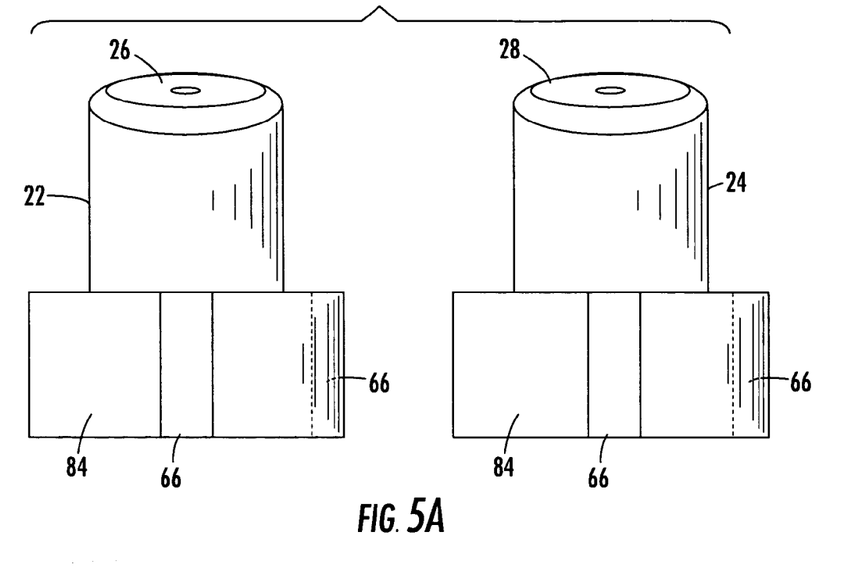
FIG. 5A is a schematic side view of a keyed ferrule holder and the end faces of two APC ferrules of a duplex fiber optic connector shown in a first keyed position to facilitate simultaneous coplanar end face polishing.
Figure 5B:
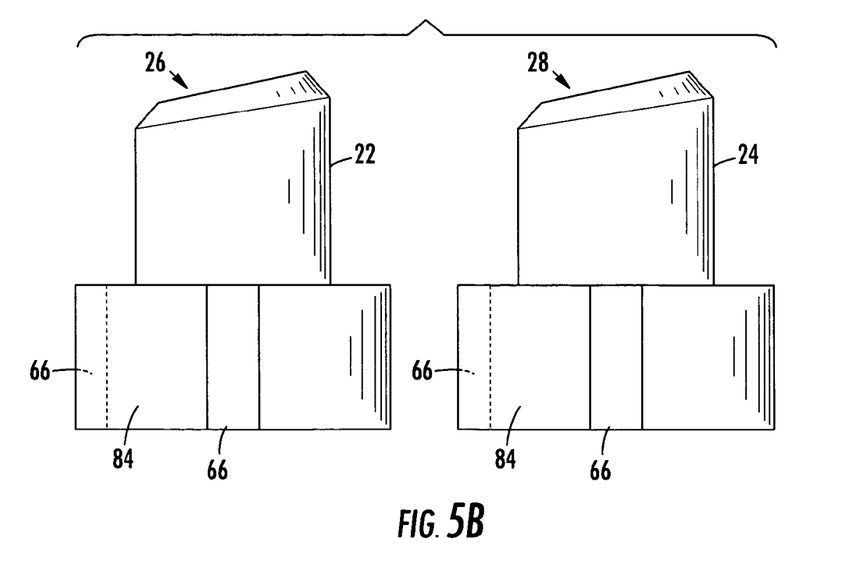
FIG. 5B is a schematic side view of the keyed ferrule holder and the end faces of the two APC ferrules of FIG. 5A shown positioned in a second keyed position for optical connection with a corresponding pair of ferrules of a mating receptacle, optical device or another connector.

Referring specifically to FIG. 5A, the end faces 26, 28 of the two APC ferrules 22, 24 of a duplex fiber optic connector are shown in a first keyed position to facilitate simultaneous coplanar end face polishing. In the embodiment shown, the key slots 66 of each ferrule holder 84 are positioned about 90-degrees apart from each other around the circumference of the ferrule holder. Referring specifically to FIG. 5B, the keyed ferrule holders 84 are rotated 90-degrees in a counter-clockwise direction to the second keyed position in order to align the end faces 26, 28 of the two APC ferrules of the duplex fiber optic connector for optical connection with a corresponding pair of ferrules of a mating receptacle, optical device or another connector. Portions of the ferrule holder 84 are removed to form the key slots 66. As described in more detail below, portions equaling the entire height of the ferrule holder 84 are removed in order to permit the ferrule 22, 24 to be depressed into its respective connector outer housing 62, 64, compress a biasing spring and clear a key defined by the connector outer housing 62, 64 so that the ferrule holder 84 can be rotated to its appropriate key position and released, thus allowing the biasing spring to extend and press the ferrule holder 84 back into place. In an alternative embodiment, only a portion of the height of the ferrule holder 84 is removed in order to define a key slot 66, and a key defined by the connector outer housing 62, 64 is received within the corresponding key slot. The ferrule holder 84 may be keyed so that it may be rotated within its respective connector outer housing 62, 64, or may be keyed so that it is fixed with respect to orientation within its respective connector outer housing such that the connector outer housing and ferrule holder assembly may be rotated together as one assembly. Although fixed in orientation, a biasing member, such as a spring, may operably engage the ferrule 22 and a component of the connector outer housing 62, 64 to urge the ferrule 22 toward the mating end of the opposing connector. In any embodiment of the invention in which the orientation of the ferrule 22 may be changed, the desired result is that the end faces 26, 28 of the ferrules 22, 24 may be rotated between various positions for a desired alignment of the end faces of the one or more ferrules.

Figure 6A:
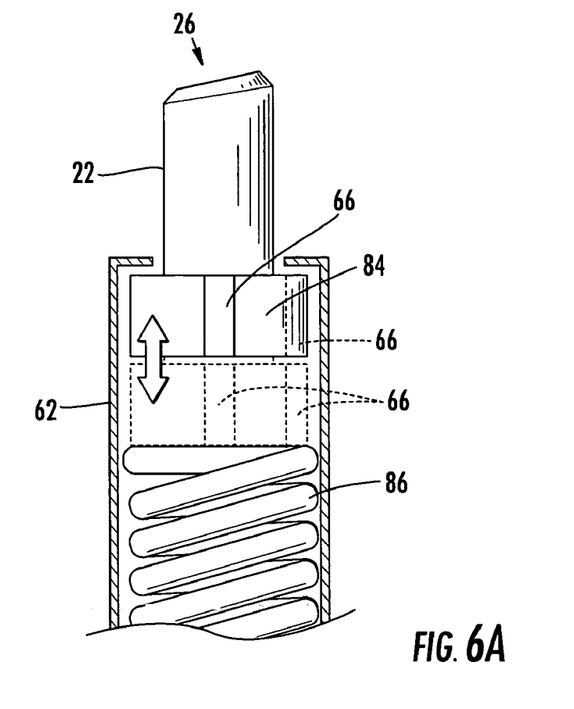
FIG. 6A is a schematic side view of a positionable ferrule holder including a biasing member for allowing the ferrule to float and to be rotated between a first keyed position and a second-keyed position.

Referring to FIG. 6A, a schematic side view of a positionable ferrule holder 84 including a biasing member 86 for allowing the ferrule 22 to float and to be rotated between a first keyed position and a second keyed position is shown. The ferrule holder 84 is not fixed within the connector outer housing 62, but is engaged by the biasing member 86. In one embodiment, the biasing member 86 may operably engage the ferrule 22 and the connector outer housing 62 to urge the ferrule 22 toward the mating end of the opposing connector, and may also be used to reconfigure the ferrule 22 by permitting the ferrule 22 to be pushed into the connector outer housing 62, clear the key (indicated at reference numeral 88 in FIG. 6B) and rotate the ferrule assembly to an alternate key slot 66. In an alternative embodiment, the key may be defined by the connector inner housing 76. In either embodiment, the ferrule holder key positions are not used for loss optimization, but for ferrule assembly positioning. Loss suppression may be accomplished by means other than ferrule assembly positioning.

Figure 6B:
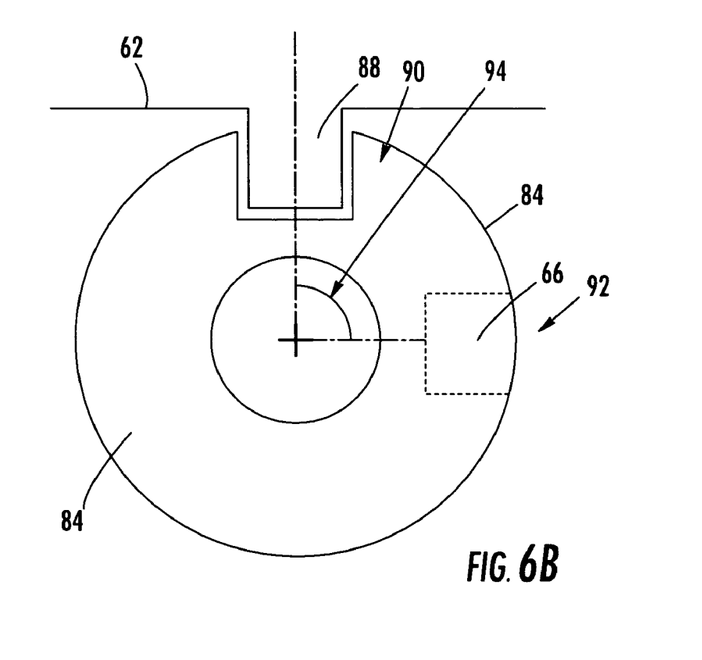
FIG. 6B is a schematic top view of the positionable ferrule holder illustrating the first keyed position for ferrule polishing and the second keyed position for mating.

Referring to FIG. 6B, a schematic top view of the positionable ferrule holder 84 of FIG. 6B is shown illustrating a first keyed position for ferrule polishing and a second keyed position for connector mating. The first keyed position 90 is positioned about 90-degress (indicated at reference numeral 94) from the second keyed position 92 around the circumference of the ferrule holder 84. A 90-degree rotation of each of the one or more ferrules about the longitudinal axis defined by the ferrule serves to re-position the ferrule end faces between a coplanar position for polishing, and once the polish is complete, a standard configuration for connector mating. As stated above, the ferrule holder 84 may be rotated to a polishing configuration from a standard mating configuration by pushing the ferrule assembly into the connector outer housing 62, clearing the key 88, and rotating the ferrule holder to the appropriate key slot 66.

In further embodiments, the entire connector housing assembly, any component thereof or the one or more ferrules themselves may be rotated between a first keyed position for end face polishing and a second keyed position for mating with a receptacle, optical device or another connector. Thus, designs for several types of connectors having rotatable ferrule assemblies may be derived from the basic design shown and described herein. In all embodiments, the polishing position aligns the end faces of the one or more ferrules in a coplanar configuration for simultaneous polishing, and the mating configuration aligns the end faces of the ferrules for interconnection with other optical fibers, such as for extending an all optical communications network to a subscriber premises, such as a residence or business. Ferrule holders having specific key slot shapes and connector components having specific key shapes may be created for each type of ferrule. While certain generic connector components may be used for all ferrule types, crimp bodies and connector housing components may have specific shapes to accommodate specific ferrules and cable types.

The embodiments described above provide advantages over conventional connector assemblies. In contrast to conventional hardened duplex fiber optic connectors that do not provide the ability to move the ferrules, the connectors of the present invention allow the ferrules to be independently positioned, thus allowing simultaneous polishing using conventional apparatus and processes. In addition, the keyed ferrule holders described herein do not increase the overall package size of the connector, thus allowing the connectors to be interconnected with conventional receptacles. Further, the keying features of these connectors makes them fully APC capable.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A fiber optic connector, comprising:
   at least one ferrule assembly comprising at least one optical fiber ferrule defining an end face, the ferrule positionable between a first polishing position for polishing the end face and a second mating position for mating the fiber optic connector; and
   a connector housing defining a key, wherein the at least one ferrule assembly defines a first key slot and a second key slot for engaging the key on the connector housing, and wherein the at least one ferrule assembly is movable between the first polishing position with the first key slot engaging the key and the second mating position with the second key slot engaging the key.

2. The fiber optic connector according to claim 1, further comprising a biasing member that engages a rear portion of the at least one ferrule and biases the ferrule outwardly from the fiber optic connector.

3. The fiber optic connector according to claim 1, comprising two ferrule assemblies each comprising at least one optical fiber ferrule defining an end face, each ferrule assembly being independently positionable relative to the other ferrule assembly between a first polishing position wherein the end faces of the ferrules are coplanar and a second mating position wherein the end faces of the ferrules are not coplanar.

4. The fiber optic connector according to claim 3, wherein the end faces of the ferrules are coplanar in the first polishing position for simultaneously polishing the end faces of the ferrules in a pre-assembled fiber optic connector.

5. The fiber optic connector according to claim 3, further comprising at least one connector inner housing defining at least one key, and where each ferrule assembly further comprises a connector outer housing defining a first key slot and a second key slot, and wherein each ferrule assembly is movable between the first polishing position with the first key slot of the respective connector outer housing engaging a key of the connector inner housing and the second mating position with the second key slot of the respective connector outer housing engaging a key of the connector inner housing.

6. The fiber optic connector according to claim 5, further comprising a biasing member that engages a rear portion of the at least one ferrule and biases the ferrule outwardly from the fiber optic connector.

7. The fiber optic connector according to claim 6, wherein each of the ferrule assemblies is moved between the first polishing position and the second mating position by pushing the ferrule assembly inwardly against the biasing member until the first key slot clears the key, moving the ferrule assembly between the first polishing position and the second mating position, and releasing the ferrule assembly such that the second key slot engages the key.

8. The fiber optic connector according to claim 1, further comprising a plug housing defining an internal cavity opening through opposed first and second ends for receiving the ferrule assembly, a flexible sealing boot, a coupling nut, a crimp body and a crimp band.

9. The fiber optic connector according to claim 1, wherein the ferrule assembly is rotatable about a longitudinal axis defied by the ferrule.

10. A fiber optic connector, comprising:
a connector housing; and
a pair of ferrule assemblies each being independently movable relative to the connector housing, each ferrule assembly comprising at last one ferrule defining an end face and a positionable ferrule holder define a first key slot for positioning the end face of the ferrule in a first polishing position and a second key slot for positioning the end face of the ferrule in a second mating position;
wherein the connector housing defines at least one key that is received within the first key slot in the first polishing position and the second key slot in the second mating position and operable for maintaining the ferrule assembly in the first polishing position and the second mating position.

11. The fiber optic connector according to claim 10, wherein the ferrules of the ferrule assemblies are selected from the group consisting of an SC angled-physical-contact (APC) ferrule and an LC angled-physical-contact (APC) ferrule.

12. The fiber optic connector according to claim 10, further comprising a biasing member that engages a rear portion of each ferrule assembly and biases each ferrule assembly outwardly from the connector housing, each biasing member being operable to permit the ferrule assembly to be pushed inwardly far enough to clear the key of the connector housing and thereby permit the ferrule holder to be moved relative to the connector housing.

13. The fiber optic connector according to claim 10, further comprising a plug housing defining an internal cavity opening through opposed first and second ends for receiving the ferrule assemblies and the connector housing, a flexible sealing boot, a coupling nut, a crimp body and a crimp band.

14. The fiber optic connector according to claim 10, wherein the first key slot and the second key slot of each ferrule holder are positioned about 90-degrees part.

15. A fiber optic connector, comprising:
a connector inner housing defining a key,
a connector outer housing defining a first key slot for positioning the connector outer housing in a first keyed position relative to the connector inner housing with the key engaging the first key slot and a second key slot for positioning the connector outer housing in a second keyed position relative to the connector inner housing with the key engaging the second key slot; and
a ferrule assembly disposed within the connector outer housing and comprising an optical fiber ferrule defining an end face and a ferrule holder.

16. The fiber optic connector according to claim 15, wherein the connector is a duplex connector comprising a pair of angled-physical-contact (APC) ferrules and wherein the end faces of the ferrules are aligned substantially coplanar in the first keyed position for simultaneous polishing, and wherein the end faces of the ferrules are aligned substantially parallel but not coplanar for mating in the second keyed position.

17. The fiber optic connector according to claim 15, further comprising a biasing element that engages a rear portion of the ferrule assembly to urge the ferrule outwardly from the fiber optic connector relative to the connector outer housing.

18. The fiber optic connector according to claim 15, further comprising a plug housing defining an internal cavity opening through opposed first and second ends for receiving the connector inner housing, the connector outer housing and the ferrule assembly, a flexible sealing boot, a coupling nut, a crimp body and a crimp band.

19. The fiber optic connector according to claim 15, wherein the connector outer housing is positionable between the first keyed position and the second keyed position by pulling the connector outer housing away from the connector inner housing, rotating the connector outer housing relative to the connector inner housing between the first keyed position and the second keyed position, pushing the connector outer housing back towards the connector inner housing and engaging the key in one of the first key slot and the second key slot.

* * * * *